(12) United States Patent
Paquette et al.

(10) Patent No.: US 8,113,415 B2
(45) Date of Patent: Feb. 14, 2012

(54) MODULAR WELDING FIXTURE

(75) Inventors: Dan Paquette, Amherstburg (CA); Larry F. Koscielski, LaSalle (CA); Eric Michaud, Amherstburg (CA)

(73) Assignee: Doben Limited, Windsor (CA)

( * ) Notice: Subject to any disclaimer, the term of this patent is extended or adjusted under 35 U.S.C. 154(b) by 892 days.

(21) Appl. No.: 11/759,469

(22) Filed: Jun. 7, 2007

(65) Prior Publication Data
US 2008/0303197 A1      Dec. 11, 2008

(51) Int. Cl.
*B23Q 7/00*      (2006.01)

(52) U.S. Cl. .......... 228/212; 219/125.1; 269/37; 29/559

(58) Field of Classification Search .................... 29/559, 29/455.1, 563, 564, 56.6; 219/125.1; 228/212–213, 228/44.3, 47.1–49.1, 49.4; 269/37–45, 55
See application file for complete search history.

(56) References Cited

U.S. PATENT DOCUMENTS

| | | | | |
|---|---|---|---|---|
| 1,986,965 A | * | 1/1935 | Frank | 174/72 C |
| 2,167,006 A | * | 7/1939 | Schmidt | 228/5.1 |
| 2,196,180 A | * | 4/1940 | Anderson | 228/28 |
| 2,685,629 A | * | 8/1954 | Peck | 219/60 R |
| 3,094,093 A | * | 6/1963 | Zimmerman | 228/8 |
| 4,641,820 A | | 2/1987 | Gold et al. | |
| 4,682,765 A | | 7/1987 | Mainville | |
| 4,683,736 A | * | 8/1987 | Weinerman et al. | 70/208 |
| 4,712,779 A | * | 12/1987 | Dearman | 269/43 |
| 4,713,873 A | | 12/1987 | Gold et al. | |
| 5,015,821 A | * | 5/1991 | Sartorio et al. | 219/124.34 |
| 5,067,535 A | * | 11/1991 | Wolff | 144/286.1 |
| 5,174,488 A | * | 12/1992 | Alborante | 228/4.1 |
| 5,732,455 A | | 3/1998 | Diede | |
| 5,873,569 A | | 2/1999 | Boyd et al. | |
| 5,984,289 A | * | 11/1999 | Bianchini | 269/32 |
| 6,089,440 A | | 7/2000 | Brusha | |
| 6,347,733 B1 | | 2/2002 | Hickey, II | |
| 6,375,178 B1 | | 4/2002 | Schilb et al. | |
| 6,382,496 B1 | * | 5/2002 | Harger | 228/44.3 |
| 6,450,490 B1 | | 9/2002 | Mangelsen et al. | |
| 6,772,932 B1 | * | 8/2004 | Halstead | 228/45 |
| 6,859,989 B2 | | 3/2005 | Bauer et al. | |
| 6,899,263 B2 | * | 5/2005 | Tappan et al. | 228/49.1 |
| 6,918,577 B2 | | 7/2005 | Ghuman et al. | |
| 6,921,011 B1 | * | 7/2005 | Mangelsen et al. | 228/44.3 |
| 2006/0108342 A1 | * | 5/2006 | Samodell et al. | 219/125.1 |

* cited by examiner

*Primary Examiner* — David Bryant
*Assistant Examiner* — Jacob Cigna
(74) *Attorney, Agent, or Firm* — Carlson, Gaskey & Olds, P.C.

(57) ABSTRACT

A tooling fixture is disclosed that includes a weldment having spaced apart lateral members interconnected by opposing side members. Spaced apart trunnions support the side members for rotation about an axis, in one example. A locating pin is arranged between each side member and trunnions to enable quick and accurate location of the tooling fixture relative to the trunnions. The pins are at a right angle relative to the axis, in one example. Tooling plates are removable secured to each of the lateral members. Adjustable brackets are secured to the tooling plates and support tooling that cooperates with a workpiece supported on the tooling fixture. In one example, jack blocks, shims, squaring plates and stops are used to permit precise adjustment and repeatable relocation of the tooling in three directions.

21 Claims, 3 Drawing Sheets

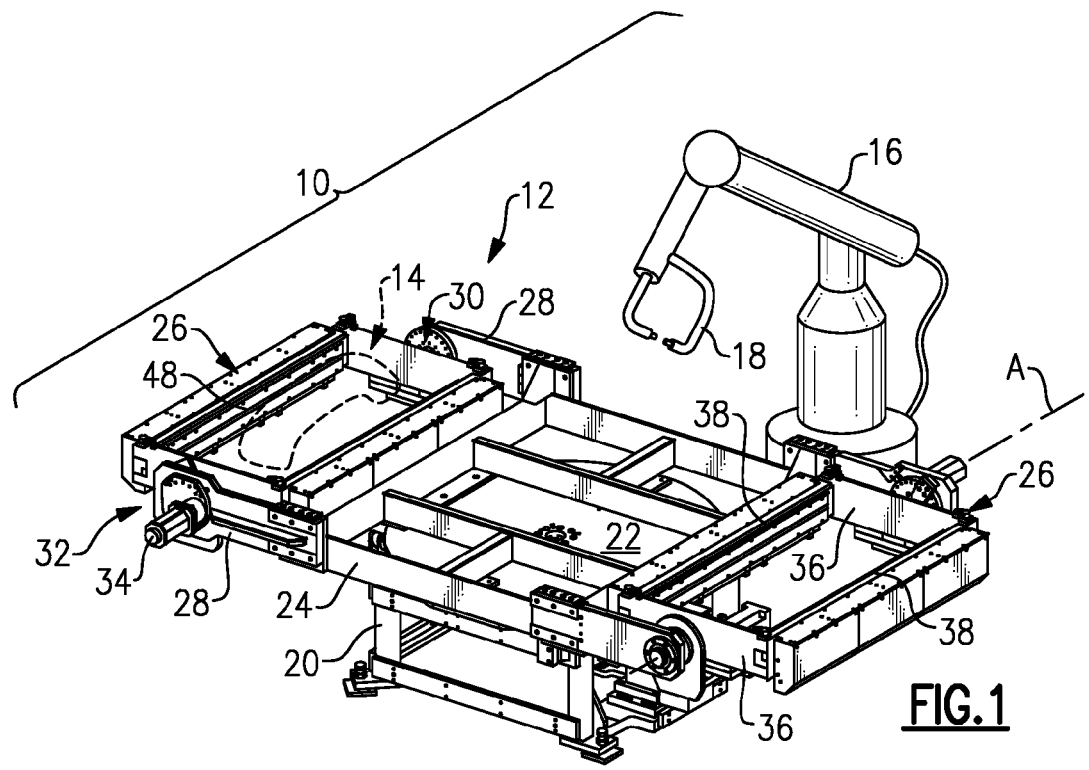

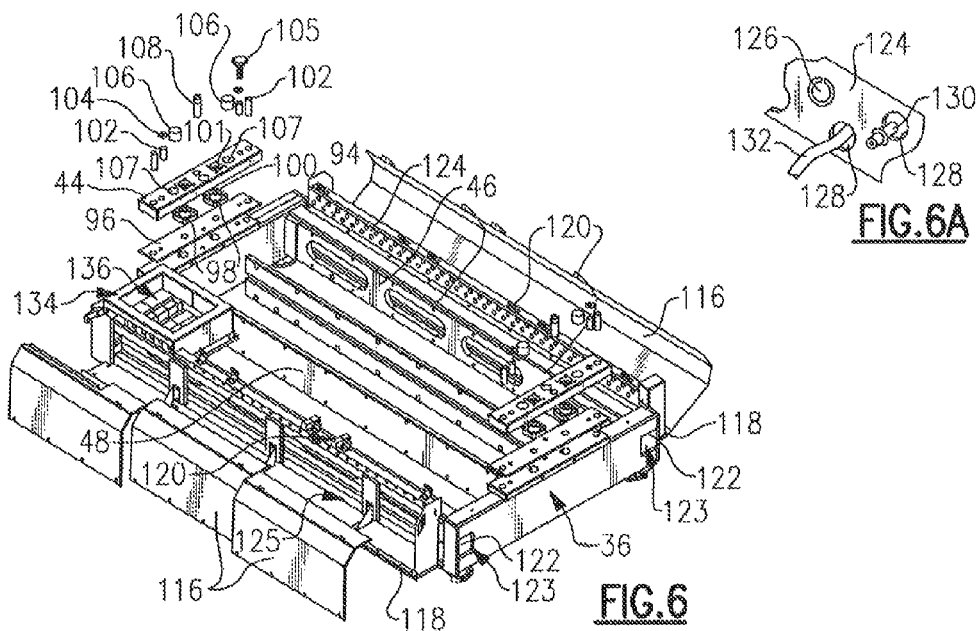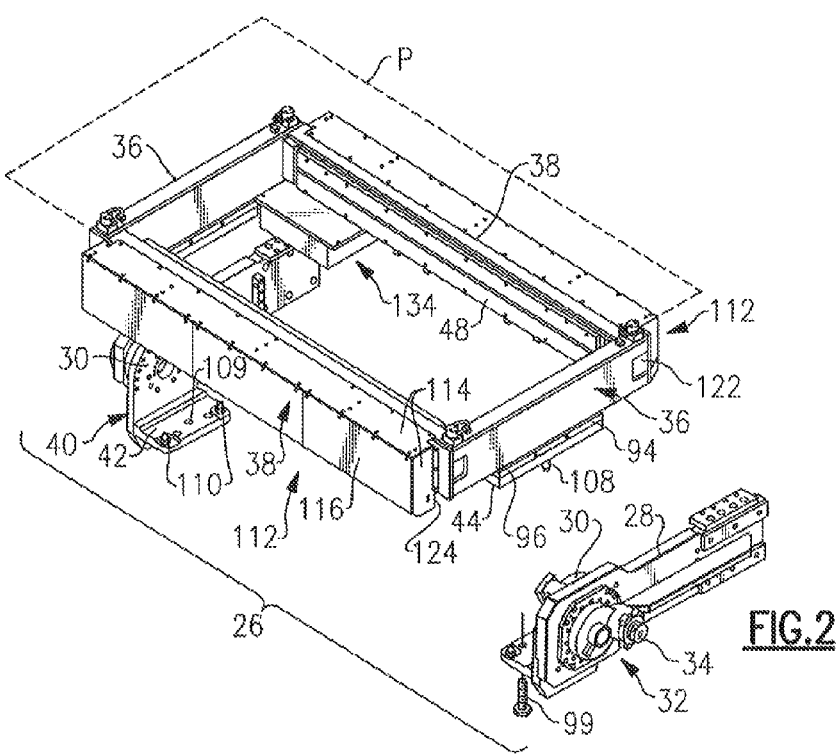

MODULAR WELDING FIXTURE

BACKGROUND

This disclosure relates to a tooling fixture used, for example, in an automated welding operation.

Tooling fixtures are frequently used in automated assembly processes, such as welding, riveting and clinching, to hold a workpiece during the operation. In one example, one or more tooling fixtures are indexed between various stations, for example, by using a vertical rotary table that operates in a ferris-wheel fashion, a linear sliding assembly, or a rotary table that operates in a horizontal plane. Often a worker will load and unload the workpiece to and from a tooling fixture at one station, and a robot will perform various operations on the workpiece mounted on the tooling fixture at another station. Trunnions are sometimes used to rotate the tooling fixture to a desired position for the worker and/or robot.

Typically, various locators, clamps and sensors are used to hold the part and detect the presence of the part to ensure proper positioning prior to performing operations on the workpiece. Tooling fixtures used for welding operations may also include components that transmit welding current, such as the workpiece lead, or provide cooling water and/or electrical or pneumatic connections.

Typical prior art welding fixtures present several problems. First, typical welding fixtures are highly customized such that they require significant reworking when being updated for a new workpiece, or the welding fixture must be scrapped. Second, it is difficult to accurately locate the various tooling such as locators, clamps and sensors within the welding fixture. This increases down time when the welding fixture is reconfigured for a new workpiece. Third, it is difficult to locate the welding fixture relative to any support structure, such as trunnions. The welding fixture must be accurately located relative the trunnions to prevent binding as the welding fixture is rotated into the desired position. Fourth, large portions of the electric and pneumatic lines are left exposed, which subjects them to damage when performing operations on the workpiece, for example, from welding sparks.

What are needed are more modular welding fixtures enabling quick and accurate positioning of both the tooling relative to the welding fixture and the welding fixture relative to the trunnions. It is also desirable to provide a welding fixture that provides better protection for electrical and pneumatic lines, for example.

SUMMARY

A tooling fixture is disclosed that includes a weldment having spaced apart lateral members interconnected by opposing side members. Spaced apart trunnions support the side members for rotation about an axis, in one example. A locating pin is arranged between each side member and trunnions to enable quick and accurate location of the tooling fixture relative to the trunnions. The pins are at a right angle relative to the axis, in one example.

Tooling plates are removable secured to each of the lateral members. Adjustable brackets are secured to the tooling plates and support tooling that cooperates with a workpiece supported on the tooling fixture. In one example, jack blocks, shims, squaring plates and stops are used to permit precise adjustment and repeatable relocation of the tooling in three directions.

The various locating features enable the tooling fixture to be removed from the work area and taken to a remote location for rework. The tooling can be quickly repositioned and verified at the remote location, for example, by using a coordinate measurement machine. The reworked tooling fixture can then be accurately mounted on the trunnions.

These and other features of the disclosure can be best understood from the following specification and drawings, the following of which is a brief description.

BRIEF DESCRIPTION OF THE DRAWINGS

FIG. 1 is a perspective view of an example welding operation work area using an example welding fixture in a rotary table configuration.

FIG. 2 is a partially exploded perspective view of the welding fixture supported by trunnions.

FIG. 5 is an exploded perspective view of an example bracket assembly used to secure the tooling to the tooling plate.

FIG. 6 is a partially exploded perspective bottom view of the welding fixture shown in FIG. 4 without the brackets or tooling.

FIG. 6A is an enlarged partially broken view of a connection panel.

DETAILED DESCRIPTION

Figure 3:
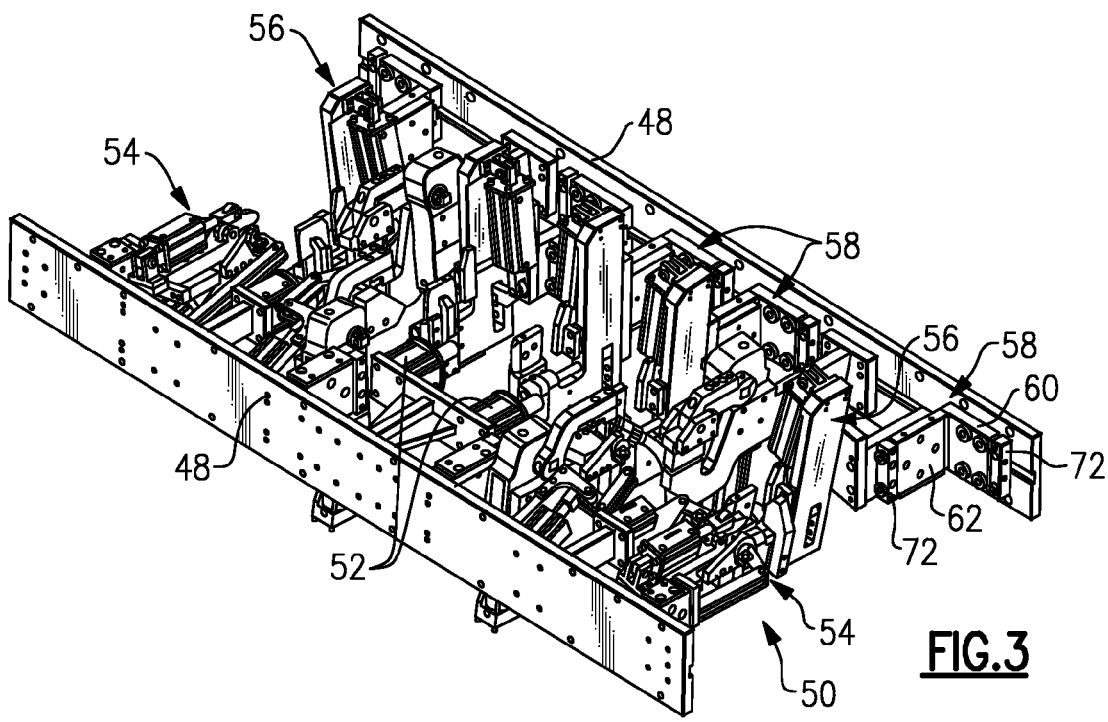
FIG. 3 is a perspective view of example tooling mounted on opposing tooling plates, which are to be secured to the welding fixture.

An example welding operation work area 10 is shown schematically in FIG. 1. A workpiece 14, such as a vehicle bumper, is retained by a welding assembly 12. A robot 16 performs various operations upon the workpiece 14, such as spot welding.

The example welding assembly 12 includes a base 20 supporting a turntable 22. A framework 24 supported on the turntable 22 and includes modular tooling fixture weldments, or tooling fixtures 26, mounted on opposing sides of the framework 24. During operation, a worker loads and/or unloads the workpiece 14 at one station on one of the tooling fixtures 26, and the robot 16 welds the workpiece 14 with its tool 18 on the other tooling fixture 26 at another station. Although the example illustrates a rotary table having a pair of tooling fixtures, it should be understood that the modular tooling fixture 26 can be used in other welding assembly configurations. Furthermore, the example tooling fixture 26 can be used in operation other than welding.

In the example arrangement, a pair of arms 28 is secured to the framework 24 to support each of the tooling fixtures 26. The arms 28 include trunnions 30 that rotate the tooling fixtures 26 about an axis A to move the workpiece 14 in a desired position relative to the robot 16 and/or worker. At least one of the trunnions 30 for each tooling fixture 26 includes a headstock 32 having a motor 34 that rotationally drives the tooling fixture 26 about the axis A. The other trunnion 30 rotationally supports the other side of the tooling fixture 26.

Referring to FIGS. 1 and 2, the example modular tooling fixture 26 is a box-shaped structure that includes side members 36 welded to spaced apart lateral members 38. In one example, the trunnions 30 include supports 40 having a pad 42. The side members 36 are supported by the pad 42 and secured relative thereto. The side members 36 must be located precisely relative to the pads 42 so that the tooling fixture 26 does not bind as the motor 34 rotates the fixture assembly 26 about the axis A. To this end, the side members 36 include locating plates 44, which includes various locating features that will be discussed in more detail below.

Referring to FIGS. 2-4 and 6, the lateral members 38 include tooling plate mounts 46 to which tooling plates 48 are secured. Brackets 58, which support tooling 50, are secured to the tooling plates 48 in desired positions. It is desirable to quickly and precisely locate the tooling 50 for a particular workpiece 14 to reduce maintenance time and cost as well as the cost associated with part changeovers.

Referring to FIG. 3, typical tooling 50 employed for retaining the workpiece 14 includes locators 56 and clamps 54, which hold the workpiece 14 in a desired position to ensure that the tool 18 engages the workpiece 14 at the desired locations. Shaping cylinders 52 are also employed in one example to exert forces on the workpiece 14 during welding operations to prevent distortion of the workpiece 14 from heat during welding.

Figure 4:
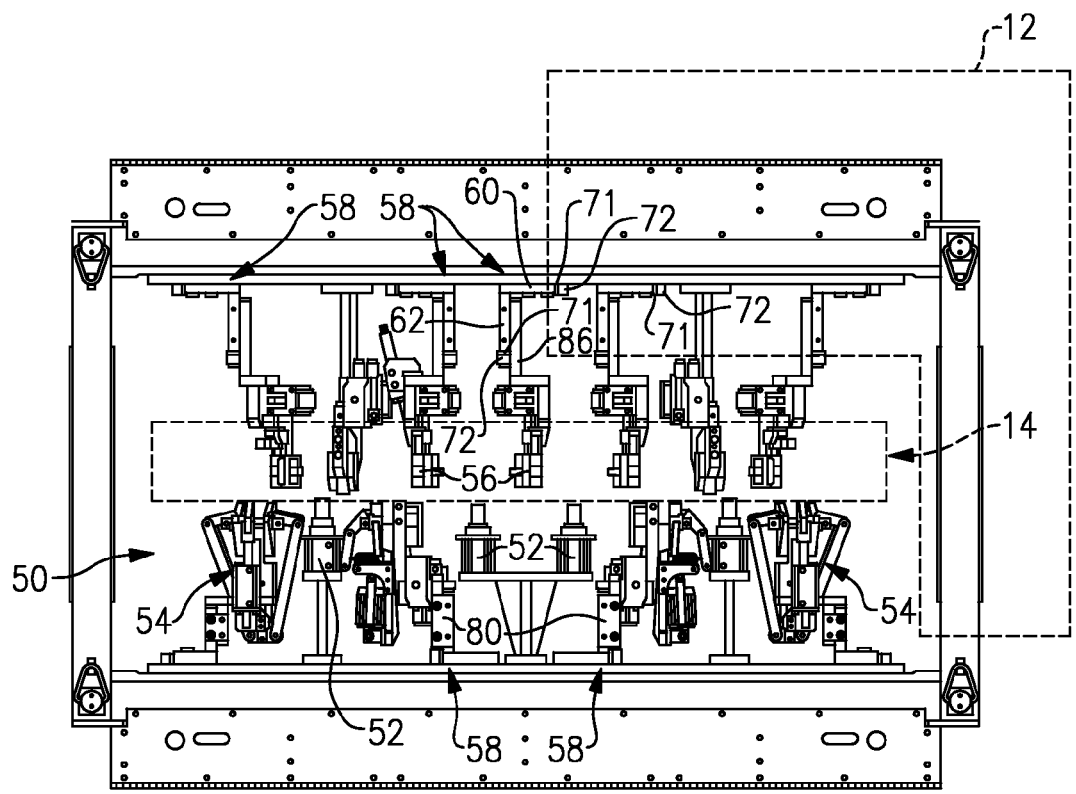
FIG. 4 is a top elevational view of the tooling shown in FIG. 3 with the tooling plates secured to the welding fixture.

Referring to FIGS. 4 and 5, the example brackets 58 are multi-piece components that are adjustable relative to one another to enable quick and easy position adjustments of the tooling 50. In one example, a first plate 60 is secured to and arranged generally horizontally relative to the tooling plate 48. A second plate 62 extends from the first plate 60 at a right angle, for example. The tooling plate 48 includes multiple holes 70 for receiving fastener 64, which are threaded bolts, for example, that extend through enlarged holes 68 in the first plate 60. Washers 66 are arranged between the fastener 64 and the first plate 60. In one example, the washers 66 are relatively thick to distribute the clamping load exerted by the fastener 64 on the first plate 60. The enlarged holes 68 have a diameter that is substantially larger than the diameter of the fastener 64 to enable adjustment of the bracket 58 in a plane X-Y corresponding to the tooling plate 48.

A jack block 72 is secured to the tooling plate 48 by fasteners 74 received by holes 75. The fasteners 74 extend through enlarged holes 73 to permit adjustment of the jack block 72. Fastener 76 extends through holes 77 in the jack block 72 to secure the first plate 60 to the jack block 72. A shim 71 having notches 78, which accommodate the fastener 76, is arranged between the jack block 72 and the first plate 60. In the example shown, shims 71 and jack blocks 72 are arranged on either side of the bracket 58. The jack block 72 can be used to ensure that the first plate 60 can easily be secured in its previous location if removed for servicing, such as a tooling change.

In one example method of adjustment, the fasteners 64, 74 are loosened and the shims 71 are removed. The large clearance between the fasteners 64, 74 and the enlarged holes 68, 73 enables the bracket to be adjusted in both the first and second directions in the X-Y plane. Once the bracket 58 is in a desired position, the fasteners 64 are tightened to secure the bracket 58 to the tooling plate 48. New shims 71, if necessary, are machined to a desired thickness for placement between the jack blocks 72 and the first plate 60. The fasteners 76 are tightened to secure the jack blocks 72 and first plate 60 to one another. The bracket 58 can then be removed by leaving the jack blocks 72 secured and by removing the fasteners 64, 76 and shims 71. The jack blocks 72 and replacement of the fasteners 76 locate the bracket 58 in the same Y position, and replacing the shims 71 locates the bracket 58 in the same X position. In this manner, the bracket 58 can be removed and replaced quickly and accurately.

A tooling pad 86 supports the tooling 50 relative to the bracket 58 using fasteners 92 that extend through washers 66 and enlarged holes 88 to threaded holes 89. Squaring plates 80 are used on either side of the tooling pad 86 to locate and square the tooling pad 86 relative to the second plate 62 and prevent adjustment of the tooling pad 86 in the Y direction. In the example, fasteners 82 extend through washers 84 and enlarged holes 81 and are received in holes 83 to secure the squaring plates 80 to the tooling pad 86. One side of the squaring plate 80 is secured to the second plate 62 using fasteners (not shown) and does not provide adjustability of the squaring plate 80 relative to the second plate 62 in the example. The squaring plate 80 permits the tooling pad 86 to be slid and adjusted in the Z direction.

A jack block 72 and shim 71 may also be used adjacent to the tooling pad 86 to set the desired Z position. A stop 90 limits the adjustment of the tooling pad 86 in the Z direction and can be used to quickly relocate the tooling pad 86 relative to the bracket 58 subsequent to removal to obtain the desired Z position provided by the shim 71, similar to the method described above. The fasteners 82, 92 are loosened to permit adjustment of the tooling pad in the Z direction.

The tooling 50 can be positioned at a remote location by placing the tooling fixture 26 on a coordinate measurement machine. The brackets 58 and their tooling 50 can be adjusted and verified before the tooling fixture is mounted onto the framework 24.

Referring to FIGS. 2 and 6, the modular tooling fixture 26 includes locating features that facilitate precise alignment of the tooling fixture 26 relative to the pads 42 associated with the trunnions 30. This ensures that the tooling fixture 26 can be quickly and precisely positioned relative to the trunnions 30 to prevent binding of the tooling fixture 26 as it rotates about the axis A. As a result, the tooling fixture 26 can be removed from the work area for more rapid or cost effective retooling or maintenance at a remote location.

A plate 94 is secured to each of the side members 36, such as by welding. An insulating sheet 96 is arranged between the plate 94 and the locating plate 44 to prevent welding current from passing through the tooling fixture 26 and into the rest of the welding assembly 12. Nuts 98 are captured in a backside of the locating plate 44. The nuts 98 includes bosses 100 that extend through and are located relative to holes 101 in the locating plate 44. Fasteners 99 extend through holes in the pads 42 and are received by the nuts 98 to secure the tooling fixture 26 to the pads 42.

Insulating tubes 102 extend through holes in the locating plate 44, insulating sheet 96 and plate 98 to precisely locate the locating plate 44 relative to the plate 94. Fasteners 105 extend through the insulating tubes 102 secure the locating plate 44 relative to the plate 94. Insulating washers 104 are arranged between the fasteners 105 and the locating plate 44.

Bushings 106 are received by holes 107 in the locating plate 44 and support locating pins 110 (FIG. 2) extending from each pad 42. In one example, the bushings 106 are only received in the locating plate 44 and are isolated from the plate 94 by the insulating sheet 96. This is desirable, for example, since the bushings 106 are subject to impact forces and wear when the tooling fixtures 26 are located and secured relative to the pads 42. A locating pin 108 may also be provided on the plate 94 and received in a corresponding hole 109 in the pads 42.

In the example tooling fixture 26, the pins 108, 110 and their corresponding holes 109, 106 are arranged transverse to the axis A. The pins 108, 110 are arranged perpendicularly, for example, relative to a plane P provided by the tooling fixture 26. In this manner, the tooling fixture 26 can be raised vertically off and lowered vertically on the pads 42 during dismounting and mounting.

Referring to FIG. 6, the tooling fixtures 26 includes enclosures 112 adjacent to the tooling plate 48 for protecting various tooling wires and lines from damage, for example, during workpiece loading and unloading and from welding sparks. Enclosure 112 includes walls 114 that provide a cavity 125 for housing the wires and lines. Access panels 116 are movable relative to the lateral members 38 about hinges 118 to an open position, providing access to the wires and lines within the cavity 125. The access panels 116 are retained in a closed position by latches 120. The side members 36 include access holes 122 that enable the wires and lines to be more easily routed through a passage 123 in the side members 36 between the lateral members 38 from an area exterior to the tooling fixture 26.

Referring to FIGS. 6 and 6A, the enclosure 112 includes a connection panel 128 that provides access between the tooling 50 and the cavity 125 provided by the enclosure 112. The connection panel 124 includes knock-outs 126 that when removed provide holes 128. A connector 130 can be mounted within each hole 128, for example, or the wires/lines 132 can be passed through the holes 128 from the cavity 125 to an area exterior to the tooling fixture 26. The connector 130 is a quick connect pneumatic fitting, in one example.

In one example, the tooling fixtures 26 include a valve enclosure 134, shown in FIG. 6. The valve enclosure 134 at least partially encloses and protects valves 136 that are used to selectively actuate the cylinders 52 and clamps 54, for example.

Although an example embodiment has been disclosed, a worker of ordinary skill in this art would recognize that certain modifications would come within the scope of the claims. For that reason, the following claims should be studied to determine their true scope and content.

What is claimed is:

1. A tooling fixture comprising: a weldment having at least one tooling plate configured to support tooling that is configured to secure a workpiece to the weldment for manipulation of the workpiece by a robot; and at least one enclosure secured to the weldment adjacent to the at least one tooling plate and providing a protected cavity, the at least one enclosure including a movable panel covering the cavity, and a connection panel configured to provide a hole permitting access from an exterior of the at least one enclosure to the cavity; wherein the weldment includes spaced apart opposing lateral members, each lateral member supporting one of a pair of the tooling plates, and spaced apart side members extending transversely from and adjoining the opposing lateral members, at least one enclosure supported on each of the opposing lateral members, and multiple tooling secured to one of the pair of the tooling plates and facing the other of the pair of tooling plates; wherein at least one of the side members including an access hole from the exterior of the at least one enclosure to an inside passage of the side member, the inside passage connecting the cavities of opposing enclosures.

2. The tooling fixture according to claim 1, wherein the connection panel includes frangible knock-outs removable there from and configured to provide the holes when removed, wherein the connection panel is carried by the weldment.

3. The tooling fixture according to claim 1 comprising a latch, the movable panel hinged relative to the at least one tooling plate for rotation between open and closed positions, the movable panel covering the cavity and the latch securing the movable panel in the closed position.

4. The tooling fixture according to claim 1, wherein at least one of wires and lines are arranged within the at least one enclosure.

5. The tooling fixture according to claim 1, wherein the side member includes an access hole from the exterior of the at least one enclosure to the inside passage of the side member, the inside passage connected to at least one of the cavities.

6. The tooling fixture according to claim 1, comprising a work area, wherein the robot and the weldment are arranged in the work area, wherein the robot is located exteriorly of the at least one enclosure.

7. The tooling fixture according to claim 1, wherein the tooling includes at least one of a locator, a clamp and a shaping cylinder configured to desirably position the workpiece relative to the robot.

8. The tooling fixture according to claim 7, wherein a valve enclosure is carried on the weldment, and houses valves configured to actuate at least one of the clamp and the shaping cylinder.

9. The tooling fixture according to claim 1 comprising:
an assembly including a bracket configured to support the tooling, the bracket having a first plate secured to the tooling plate, a jack block secured to the tooling plate and a shim arranged between the first plate and the jack block, the shim providing a desired spacing between the jack block and first plate corresponding to a desired position of the tooling.

10. The tooling fixture according to claim 9, wherein the first plate includes enlarged holes and fasteners extending through the enlarged holes securing the first plate to the tooling plate, the enlarged holes configured to permit adjustment of the first plate relative to the tooling plate in first and second directions, the shim and jack block retaining the first plate in the desired position along at least one of the first and second directions.

11. The tooling fixture according to claim 9, wherein the bracket includes a second plate secured to and extending transversely from the first plate, the assembly includes a tooling pad supporting the tooling and secured to the second plate.

12. The tooling fixture according to claim 11, wherein one of the second plate and tooling pads includes enlarged holes and fasteners extending through the enlarged holes securing the tooling pad to the second plate, the enlarged holes configured to permit adjustment of the tooling pad relative to the second plate in a direction.

13. The tooling fixture according to claim 11 wherein the assembly includes a squaring plate secured to one of the tooling pad and second plate, the squaring plate configured to constrain adjustment of the tooling pad to the direction.

14. The tooling fixture according to claim 13 comprising a stop secured the second plate and configured to limit the travel of the tooling pad and provide the desired position relative to the direction.

15. The tooling fixture according to claim 1, wherein the weldment includes opposing sides, and comprising:
spaced apart trunnions supporting the opposing sides configured for rotation about an axis relative to the robot; and
a locating assembly arranged between each of the opposing sides and the trunnions, the locating assemblies each including a locating pin extending transverse to the axis of rotation.

16. The tooling fixture according to claim 1, wherein the weldment includes spaced apart tooling plates extending between the opposing sides and configured to support the tooling.

17. The tooling fixture according to claim 16, wherein the weldment defines a plane, and the locating pins extend perpendicularly relative to the plane.

18. The tooling fixture according to claim 1, comprising an insulating sheet arranged between each side member and one of a series of locating plates, the locating plates secured to the side members and supporting the locating assemblies.

19. The tooling fixture according to claim 18, wherein the trunnions each include a support having a pad, the pads providing a portion of the locating assemblies.

20. The tooling fixture according to claim 19, wherein one of the locating plates and pads includes the pins and the other of the locating plates and pads includes holes receiving the pins.

21. The tooling fixture according to claim 19, wherein fasteners secure the pads to the locating plates.

* * * * *